United States Patent [19]
Arlen

[11] 3,787,126
[45] Jan. 22, 1974

[54] HANDLEBAR ASSEMBLIES
[75] Inventor: Richard Arlen, West Bridgford, England
[73] Assignee: Raleigh Industries Limited, Nottingham, England
[22] Filed: Jan. 6, 1972
[21] Appl. No.: 215,777

[30] Foreign Application Priority Data
Jan. 7, 1971 Great Britain .................... 767/71

[52] U.S. Cl. ........................ 403/104, 280/279
[51] Int. Cl. ............................................. F16b 7/10
[58] Field of Search ............ 287/54 E, 54.1, 58 CT; 280/279, 278; 248/188.5, 161

[56] References Cited
UNITED STATES PATENTS
1,379,784  5/1921  Schwartz .................... 287/58 CT
1,428,601  9/1922  McGuckin .................... 287/58 CT Primary Examiner—Andrew V. Kundrat
Attorney, Agent, or Firm—Kurt Shaffert et al.

[57] ABSTRACT

This invention concerns a handlebar assembly in which a handlebar stem is provided to be located within the front fork tube in such a manner that it can be raised or lowered by an amount determined by the length of a track formed in the handlebar stem which contains a ball captive in the steering head locknut.

8 Claims, 1 Drawing Figure

PATENTED JAN 22 1974        3,787,126
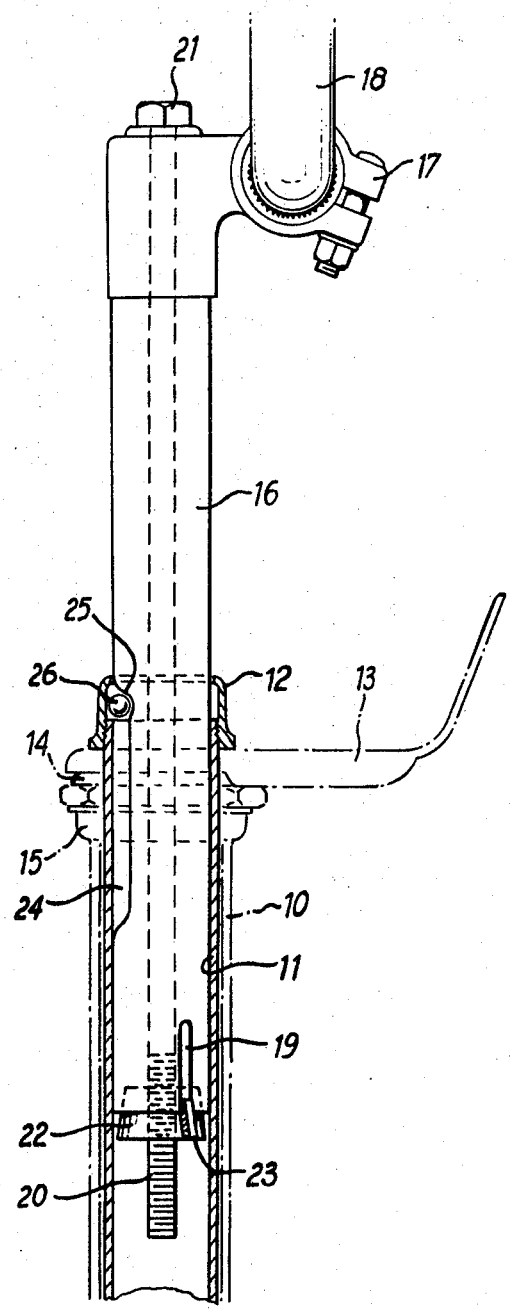

HANDLEBAR ASSEMBLIES

This invention concerns handlebar assemblies for cycles, mopeds, motor cycles and the like.

As is known a handlebar assembly normally includes a handlebar stem which is adjustably located within a steering head and is operably connected with a front fork tube.

Generally the handlebar stem is adjustable to enable the extent to which it can be raised or lowered relative to the front fork tube by slackening a bolt and sliding the stem until the desired amount thereof projects above the upper end of the steering head. The locknut is then tightened to hold the stem in position.

The object of the present invention is to provide, in a handlebar assembly, a means which will serve to limit the amount by which the handlebar stem can be raised or lowered relative to the front fork tube.

according to the present invention a handlebar assembly includes a handlebar stem to which a handlebar is attachable, and a front fork tube and means for locking the two in a required position and is characterised in that the handlebar stem is provided with a longitudinally disposed ball receiving track over part of its length, there being a ball locatable within the track and locatable within a steering head locknut whereby release of the locking means enables the range adjustment of the handlebar stem relative to a front fork tube to be achieved, such adjustment being limited to the length of the ball receiving track.

The invention will now be described further by way of example only, with reference to one practical form thereof and the accompanying drawing which shows, partly in section, a part of a handlebar assembly.

As shown in the drawing there is provided, within the head tube 10 of a cycle frame (such tube being shown in broken line in the drawing) a front fork tube 11 which extends above the upper end of the head tube 10 to receive a locknut 12. Below the locknut is located a lamp bracket 13 (or a spacing washer if no lamp bracket is provided) and below this a cup 14 adapted to retain a ball race (not shown) in position in a lower cup 15 which latter is carried by the head tube 10.

Slidable within the front fork tube 11 is a handlebar stem 16 which has at its upper end a bracket 17 for receiving a handle bar 18. At the lower end of the handlebar stem 16 the latter is longitudinally slit (as at 19) conveniently at three positions around its periphery spaced apart by 120° intervals.

Extending through the handlebar stem is a bolt 20 provided at its upper end with a head 21 and at its lower end with a frusto conical internally threaded element 22 upon the face of which is at least one rib 23 adapted to seat in a slit 19 to prevent rotation of the element 22.

At a position intermediate the ends of the handlebar stem 16 there is provided a ball receiving track 24 in the form of a groove extending longitudinally along the handlebar stem 16. At the upper end of this groove is provided an indent 25 for a purpose referred to below. A ball 26 is provided and, in use, is located within the groove.

To assemble the handlebar stem 16 in the front fork tube 11 the locknut is placed over the stem 16 and is moved to a position beyond the upper extremity of the groove 24. The ball 26 is placed in the indent 25 and held in position and the handlebar stem 16 is located within the front fork tube 11 with the indent 25 and ball 26 just above the upper extremity of the front fork tube 11. The locknut 12 is now screwed onto the front fork tube 12 to hold the ball in the space defined by the indent 25, the inner wall of the locknut 12 and the upper end of the front fork tube 11.

Whilst the locking element 22 is slack on the bolt 20 the handlebar stem 16 can be moved relative to the front fork tube 11 by an amount defined by the length of the groove 24. When the desired position of the handlebar stem 16 is achieved the bolt 20 is rotated to draw the element 22 tightly onto the stem 16 to expand the slit and region against the inner wall of the front fork tube 11 thus to lock the handlebar stem 16 in position.

The invention is not restricted to the precise details set out above. For example, the manner in which the handlebars 18 are secured to the stem and the manner in which the handlebar stem is locked in position inside the front fork may be different to that described and illustrated.

The terms 'upper' and 'lower' refer of course to the positions of parts of the handlebar assembly assuming the cycle to be in an upright position.

I claim:

1. A handlebar assembly including a handlebar stem to which a handlebar is attachable, and a front fork tube and means for locking the two in a required position characterised in that the handlebar stem is provided with a longitudinaly disposed ball receiving track over part of its length, there being a ball located within the track and projecting within a steering head locknut whereby release of the locking means enables the range adjustment of the handlebar stem relative to a front fork tube to be achieved, such adjustments being limited to the length of the ball receiving track.

2. A handlebar assembly as claimed in claim 1 in which the ball receiving track is in the form of a groove formed intermediate the ends of the handlebar stem, said groove having an indent preferably at its upper end.

3. A handlebar assembly as claimed in claim 1 in which the handlebar stem is slit at its lower end and said slit allowing the lower end of the stem to be expanded into gripping relationship with the front fork tube.

4. A handlebar assembly as claimed in claim 3 in which, for expansion of the handlebar stem, there is provided a frusto conical element operably connected to said stem to prevent rotation relative thereto and means for drawing said element into the stem to expand the latter.

5. A handlebar assembly as claimed in claim 4 in which the means for drawing the element into the stem is in the form of a bolt passing through the stem, relative rotation of the element and the stem being prevented by engagement of a rib on the element with a slit in the stem.

6. Ahandlebar assembly as claimed in claim 3 in which there are three equi-spaced slits in the stem.

7. A handlebar assembly as claimed in claim 1 in which the ball is retained in the track by means of a locknut located on the front fork tube, the ball being retained in the locknut by the end of the front fork tube.

8. A handlebar assembly as claimed in claim 1 in which the front fork tube is surrounded by a ball race whereby rotation of the front fork tube relative to a head tube within which it is contained is facilitated.

* * * * *